(12) United States Patent
Iwaki

(10) Patent No.: US 7,831,348 B2
(45) Date of Patent: Nov. 9, 2010

(54) FAILURE DETECTION DEVICE, FAILURE DETECTION SYSTEM AND FAILURE DETECTION METHOD

(75) Inventor: Hideaki Iwaki, Nagoya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 12/411,829

(22) Filed: Mar. 26, 2009

(65) Prior Publication Data

US 2009/0248239 A1 Oct. 1, 2009

(30) Foreign Application Priority Data

Mar. 27, 2008 (JP) ............................. 2008-083791

(51) Int. Cl.
*B60R 16/023* (2006.01)
*G06F 17/40* (2006.01)
(52) U.S. Cl. .......................................... 701/33; 701/34
(58) Field of Classification Search ........................ None
See application file for complete search history.

(56) References Cited

U.S. PATENT DOCUMENTS

| | | | |
|---|---|---|---|
| 6,611,740 B2 * | 8/2003 | Lowrey et al. ............... | 701/29 |
| 6,933,842 B2 * | 8/2005 | Oesterling et al. .......... | 340/539.24 |
| 2006/0089767 A1 * | 4/2006 | Sowa ............................ | 701/29 |
| 2008/0021607 A1 * | 1/2008 | Kato et al. ................... | 701/35 |
| 2008/0065289 A1 * | 3/2008 | Bertosa et al. ............... | 701/29 |
| 2008/0306650 A1 * | 12/2008 | Nakagaki ..................... | 701/30 |

OTHER PUBLICATIONS

Patent Abstracts of Japan; JP-2006315427A; Nov. 2006.*
Patent Abstracts of Japan; JP-2006264540A; Oct. 2006.*

* cited by examiner

*Primary Examiner*—Michael J. Zanelli
(74) *Attorney, Agent, or Firm*—Gifford, Krass, Sprinkle, Anderson & Citkowski, P.C.

(57) ABSTRACT

A failure detection device is provided that includes a failure detecting portion that detects a failure in an on-board device and sends failure information and failure notification information; a collection portion that is related to the failure detecting portion for control and receives and collects the failure information sent by the failure detecting portion; and a control portion that receives the failure notification information sent by the failure detecting portion and then sends failure reception information to the collection portion. The collection portion further receives and collects the failure reception information. The failure detection device further includes a determining portion that identifies the failure information from the failure information and the failure reception information collected by the collection portion.

7 Claims, 5 Drawing Sheets

FIG. 4

DATA FRAME AND FIELDS OF "DTC OF FAILURE" FROM ECU_A

| SENDER ID | RECEIVER ID | PAAA | SENSOR FAILURE CONTENT |

DATA FRAME AND FIELDS OF "DTC OF FAILURE RECEPTION" FROM ECU_B

| SENDER ID | RECEIVER ID | PBBB |

DATA FRAME AND FIELDS OF "DTC OF FAILURE RECEPTION" FROM ECU_C

| SENDER ID | RECEIVER ID | PCCC |

FIG. 5

COLLECTED DTCS

| TIME | DTC | | | |
|------|-----------|-------------|------|------------------------|
| T1   | SENDER ID | RECEIVER ID | PAAA | SENSOR FAILURE CONTENT |
| T2   | SENDER ID | RECEIVER ID | PBBB |                        |
| T3   | SENDER ID | RECEIVER ID | PCCC |                        |

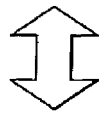

COMPARISON

PAAA
PBBB
PCCC

COMBINATION INFORMATION

FAILURE DETECTION DEVICE, FAILURE DETECTION SYSTEM AND FAILURE DETECTION METHOD

INCORPORATION BY REFERENCE

The disclosure of Japanese Patent Application No. 2008-83791 filed on Mar. 27, 2008 including the specification, drawings and abstract is incorporated herein by reference in its entirety.

BACKGROUND OF THE INVENTION

1. Field of the Invention

This invention relates to a failure detection device, a failure detection system and a failure detection method used with a passenger vehicle, an autotruck, a bus and the like.

2. Description of the Related Art

For example, Japanese Patent Application Publication No. 2006-315427 (JP-A-2006-315427) describes a vehicle in which an ECU (Electronic Control Unit) monitors failures of on-board devices that realize various control operations of the vehicle, such as sensors, an engine, and a brake. In the vehicle, a system that performs a specific vehicle control operation includes an ECU_A, a sensor that is connected to the ECU_A, and an ECU_B and an ECU_C that are connected to the ECU_A using a communication standard such as CAN (Controller Area Network). A vehicle navigation ECU is also provided that is connected to the system via CAN and monitors the system.

In this system, when a disconnection failure occurs between the sensor and the ECU_A, the ECU_A sends a DTC (Diagnostic Trouble Code) indicating the failure (hereinafter "DTC of failure") to the vehicle navigation ECU, and sends fail information to the ECU_B. Upon receiving the fail information, the ECU_B sends a DTC indicating the reception of the fail information (hereinafter, "DTC of failure reception") to the vehicle navigation ECU.

Similarly, the ECU_B sends the fail information to the ECU_C. Upon receiving the fail information, the ECU_C sends a DTC of failure reception to the vehicle navigation ECU. Thus, the vehicle navigation ECU collects both the DTC of failure and the DTC of failure reception to monitor the operation of the system, transmits both the DTCs to a center on a road side (hereinafter "roadside center") via a base station and network. The center on the road side analyzes, for example, failed parts and failure frequency of each motor vehicle line based on both the DTCs, and creates a failure database. The failure database may be used for repair of vehicles at car dealers.

In the above-described system, because both the DTC of failure and the DTC of failure reception are transmitted to the roadside center, the communication loads and costs using the network and base stations increase. Moreover, the DTC of failure reception sent by the above-described ECU_B or ECU_C is a DTC indicating a passive failure arising from the ECU_A rather than indicating the failure arising from the ECU_B or the ECU_C itself. Nevertheless, such DTCs are reflected in the failure database. Therefore, the accuracy of the analysis of failed parts and failure frequency may be reduced.

SUMMARY OF THE INVENTION

The present invention provides a failure detection device, failure detection system and a failure detection method that do not increase the communication loads and costs, and improves accuracy of analysis.

A first aspect of the present invention provides a failure detection device that includes a failure detecting portion that detects a failure in an on-board device and sends failure information and failure notification information; a collection portion that receives and collects the failure information sent by the failure detecting portion; and a control portion that is related to the failure detecting portion for control and receives the failure notification information sent by the failure detecting portion and then sends failure reception information to the collection portion. The collection portion further receives and collects the failure reception information. The failure detection device further includes a determining portion that identifies the failure information from the failure information and the failure reception information collected by the collection portion.

The control portion may include a plurality of control portions. In this case, the failure detecting portion may send the failure notification information to one of the plurality of control portions, upon detecting the failure in the on-board device. The one of the plurality of control portions may send the failure notification information to another one of the plurality of control portions, upon receiving the failure notification information from the failure detecting portion. In the same manner, the rest of the plurality of control portions may perform the reception and transmission of the failure notification information. Thus, all of the plurality of control portions can receive the failure notification information.

The determining portion may be provided in advance with combination information of the failure information and the failure reception information, and may identify the failure information from the failure information and the failure reception information collected by the collection portion based on the combination information.

According to this construction, the failure information can be identified using the following fact. That is, in a system that includes the failure detecting portion and at least one control portion to realize the predetermined vehicle control operation, the time point when the collection portion receives the failure information from the failure detecting portion is slightly earlier than the time point when the collection portion receives the failure reception information from the control portions. Thus, the failure information and the failure reception information form a sequence of temporally consecutive pieces of information in a predetermined period of time. Using this fact, the failure information located at the head of the sequence can be identified.

The determining portion may identify the failure information based on a comparison between element information included in the failure information and element information included in the failure reception information.

According to this construction, the determining portion can identify only the failure information from the failure information and the failure reception information that are once collected and stored in the storage medium by the collection portion based on the comparison between the element information included in the failure information and the element information included in the failure reception information.

Thus, with either of the above-described methods for identifying the failure information, the determining portion can identify only the failure information from the failure information and the failure reception information that are once collected and stored in the storage medium by the collection portion.

The failure detection device may further include a transmission portion that transmits the failure information identified by the determining portion to a roadside center.

According to this configuration, because the transmission portion transmits only the failure information to the roadside center, the loads and costs for the communication between the transmission portion and the roadside center via network and a base station are reduced. Moreover, because the failure reception information, which indicates a passive failure that arises from the failure in the failure detecting portion, and does not arise from the failure in the control portion itself, is not reflected in a failure database created at the roadside center, reduction in the accuracy of analysis of failed parts and failure frequency performed at the roadside center is prevented.

A second aspect of the present invention provides a failure detection system including the failure detection device as described above and the roadside center.

According to the second aspect of the present invention, from the failure information and the failure reception information that are once collected and stored in the storage medium, only the failure information that must be reflected in the failure database created at the roadside center can be identified. Moreover, because only the failure information is transmitted to the roadside center, the loads and costs for the communication between the transmission portion and the roadside center via the network and the base station are reduced.

In addition, because the failure reception information that indicates a passive failure arising from the failure in the failure detecting portion is neither transmitted to the roadside center nor reflected in the failure database created at the roadside center, the accuracy of analysis of failed parts and failure frequency performed at the roadside center improves.

A third aspect of the present invention provides a failure detection method including detecting a failure in an on-board device; sending failure information when the failure of the on-board device is detected; receiving and collecting the failure information; sending failure notification information when the failure of the on-board device is detected; sending failure reception information when the failure notification information is received; receiving and collecting the failure reception information; and identifying the failure information from the failure information and the failure reception information collected.

The failure detection method may further include transmitting the identified failure information to a roadside center.

According to the third aspect of the present invention as well, because, from the failure information and the failure reception information once collected and stored in the storage medium, only the failure information that must be reflected in the failure database can be identified and only the identified failure information is transmitted to the roadside center, the loads and costs for the communication via network and a base station are reduced. Moreover, because the failure reception information is not reflected in the failure database created at the roadside center, reduction in the accuracy of analysis of failed parts and failure frequency performed at the roadside center is prevented.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 4 is a schematic diagram illustrating a control operation of the failure detection device according to the embodiment of the present invention;

FIG. 5 is a schematic diagram illustrating the control operation of the failure detection device according to the embodiment of the present invention.

DETAILED DESCRIPTION OF EMBODIMENTS

Figure 1:
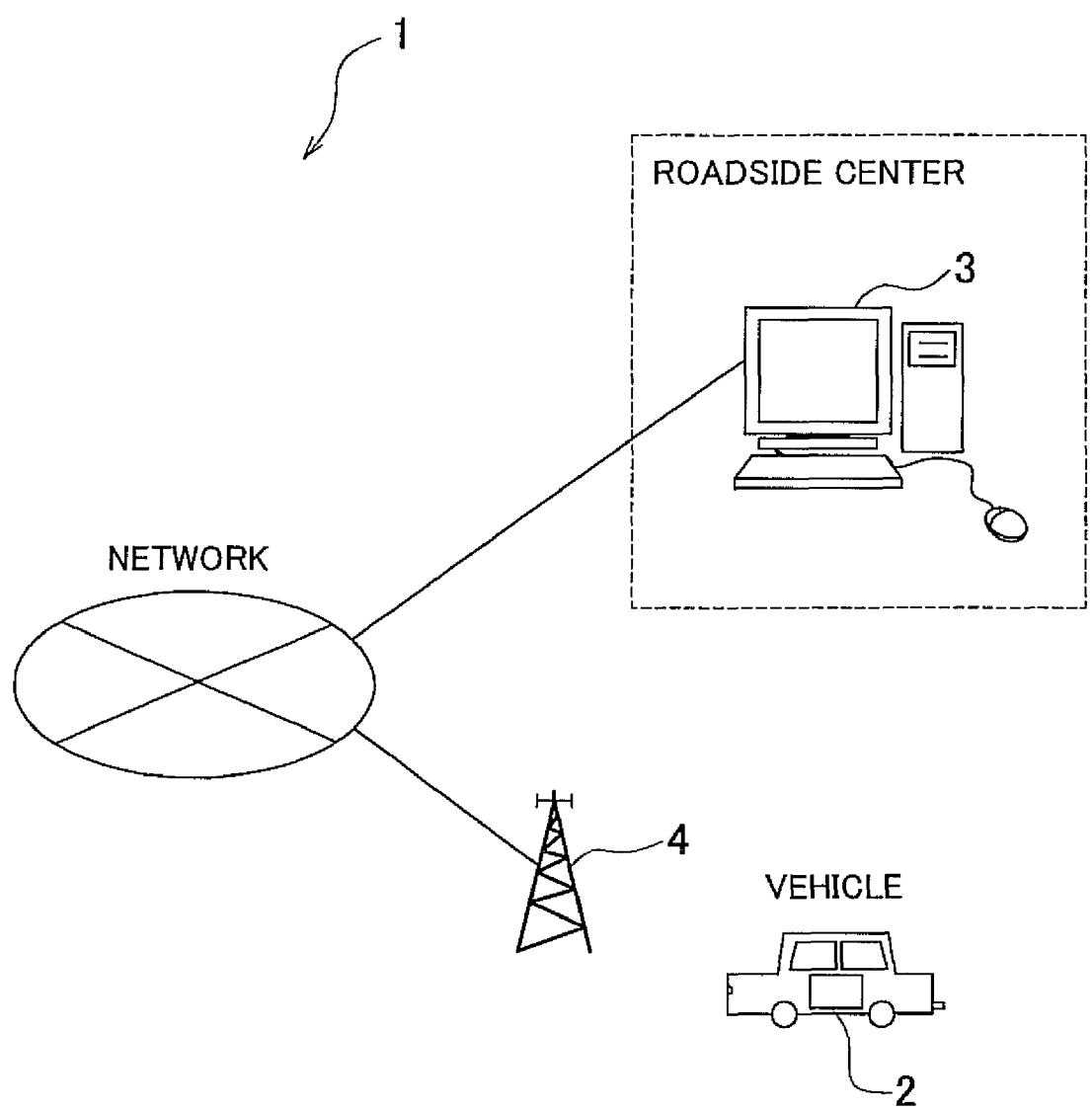
FIG. 1 is a block diagram illustrating a failure detection system according to an embodiment of the present invention.
Figure 2:
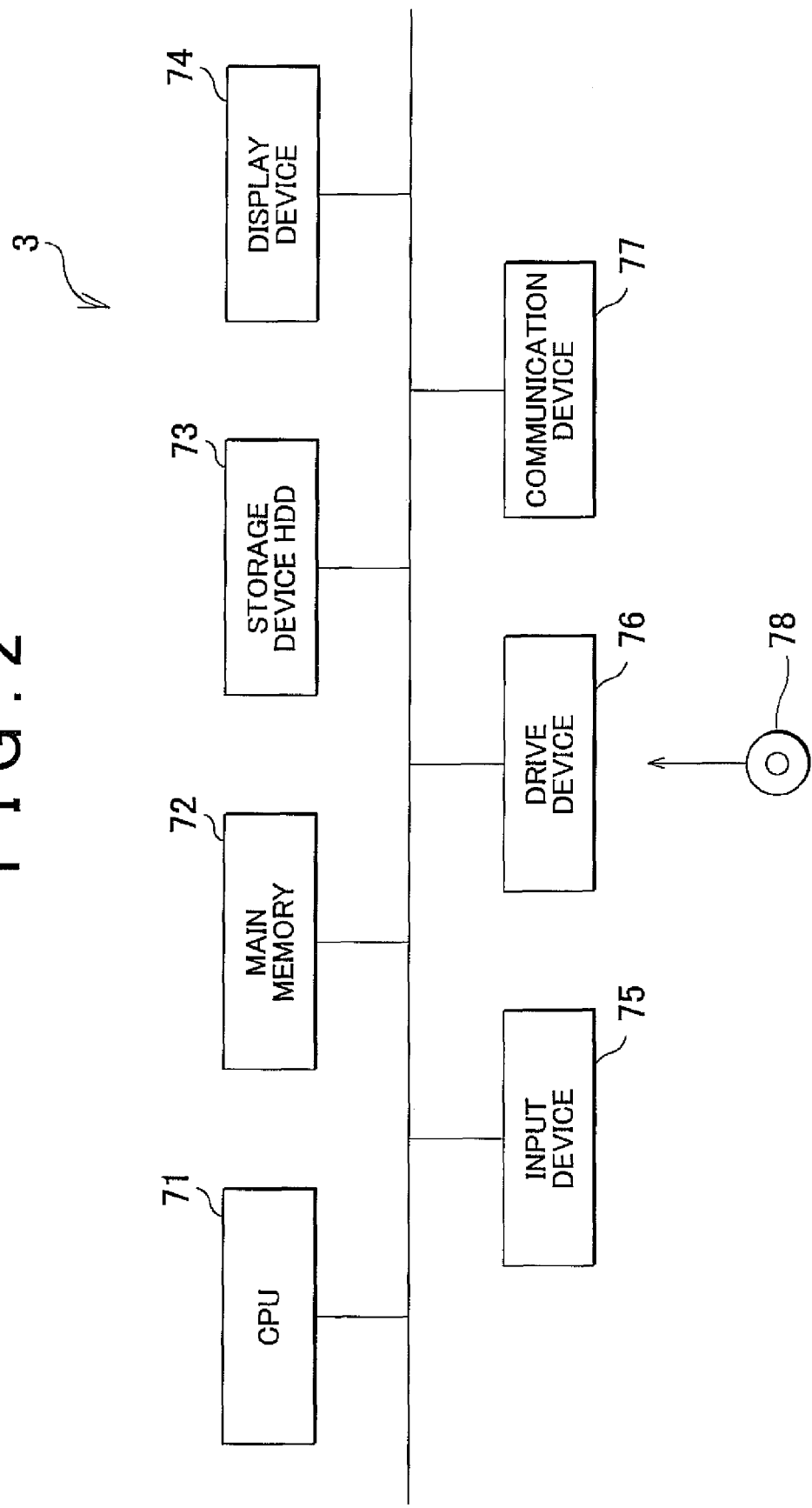
FIG. 2 is a block diagram illustrating a part of the failure detection system according to the embodiment of the present invention.
Figure 3:
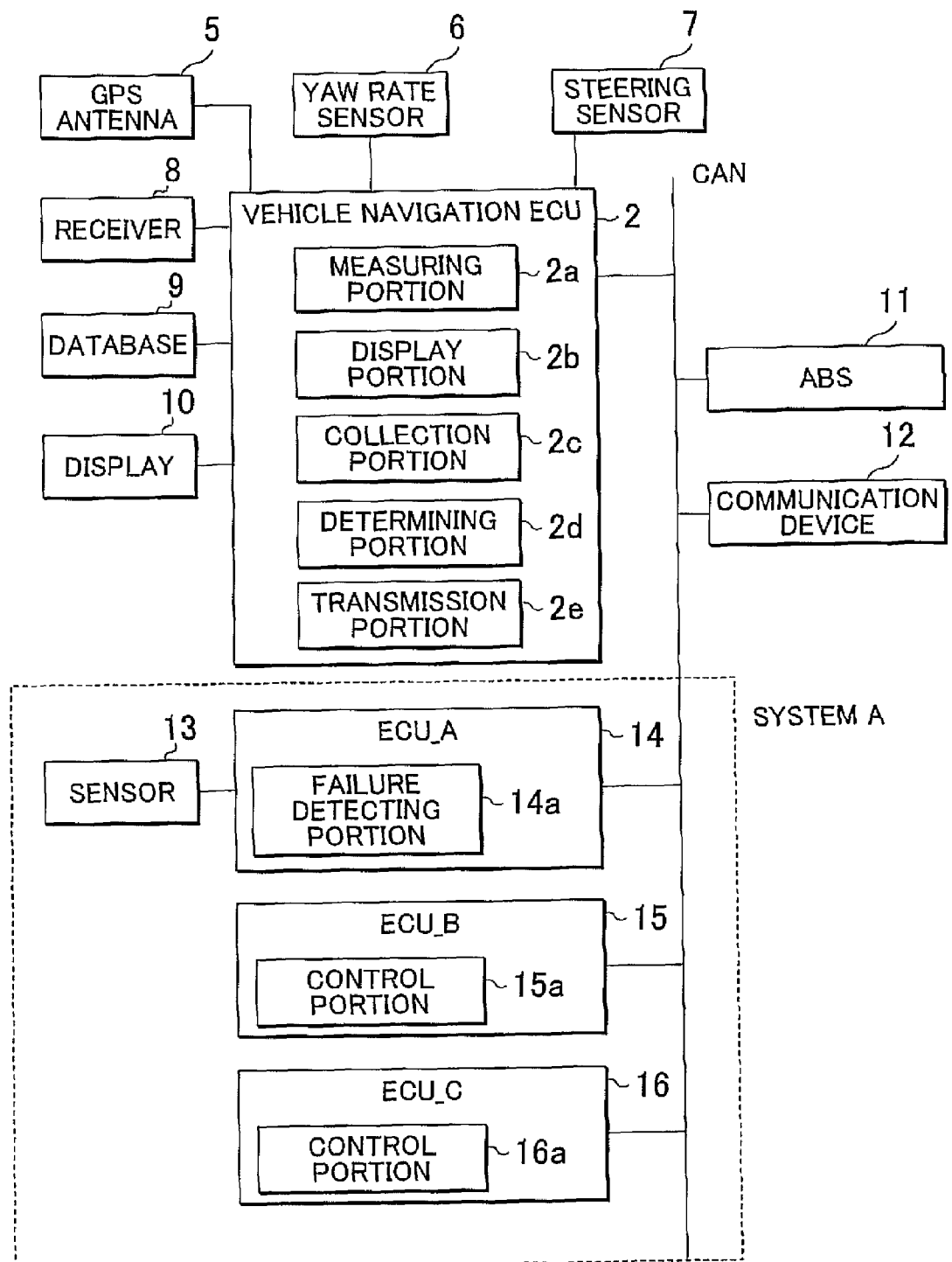
FIG. 3 is a block diagram illustrating a failure detection device according the embodiment of the present invention.

Hereinafter, an embodiment of the present invention will be described with reference to drawings. FIG. 1 is a block diagram illustrating a failure detection system according to an embodiment of the present invention. FIG. 2 is a block diagram illustrating a part of the failure detection system according to the embodiment of the present invention. FIG. 3 is a block diagram illustrating a failure detection device according the embodiment of the present invention. Further, each of FIG. 4 and FIG. 5 is a schematic diagram illustrating a control operation of the failure detection device according to the embodiment of the present invention.

A failure detection system 1 includes vehicle navigation ECUs (Electronic Control Units) 2 respectively installed in plural vehicles, a server 3 provided in the roadside center and a base station 4. The server 3 and the base station 4 are connected to each other via network, and the vehicle navigation ECU 2 can perform wired or wireless communication with the base station 4 connected to the network.

This network may include, for example, wired network, such as public switched telephone network (PSTN), integrated services digital network (ISDN) and an optical fiber. The network may also include wireless network, such as mobile telephone network, PHS (Personal Handy Phone System) network, wireless LAN (Local Area Network), WiMAX (Worldwide Interoperability for Microwave Access) network, satellite telephone and a beacon.

With the network, the server 3 and the vehicle navigation ECU 2 communicate with each other using Point to Point Protocol (PPP). Data link is established therebetween using PPP to realize TCP/IP (Transmission Control Protocol/Internet Protocol), which is an upper layer protocol of PPP, or HTTP (Hyper Text Transfer Protocol) or FTP (File Transfer Protocol), each of which is an upper layer protocol of TCP/IP. The network forms an Internet or WAN (Wide Area Network) to enable transmission and reception of transmission data including a DTC (Diagnostic Trouble Code) indicating a failure (hereinafter "DTC of failure").

Next, the server 3 in the roadside center will be described in detail with reference to the drawings. FIG. 2 is a schematic diagram illustrating the server 3 in the roadside center, which is a part of the failure detection system 1 according to the embodiment of the present invention. The server 3 performs a control operation at the roadside center according to the embodiment of the present invention.

As shown in FIG. 2, the server 3 includes a CPU 71, a main memory 72, a storage device 73 like a HDD, a display device 74, an input device 75, a drive device 76 and a communication device 77, which are mutually connected via a bus.

The CPU 71 reads programs, such as OS (Operating System) and application programs, from the storage device 73 and executes the programs to provide various functions. The CPU 71 is responsible for overall control of the operations performed by the server 3. The main memory 72 is formed of a RAM, and provides a temporary work area in which the OS, application programs and data are temporary stored.

The storage device 73 is a nonvolatile memory like a HDD or a flash memory, and stores files of the OS, application programs, drivers, etc., and DTCs of failure included in transmission data transmitted from the vehicle navigation ECU 2 and received via the communication device 77. The storage device 73 further stores a failure database indicating failed parts and failure frequency of each motor vehicle line that is created by analyzing the stored DTCs of failure with statistical processing.

The display device 74 draws an image on a display like a liquid crystal display at a preset resolution and a preset number of colors according to the commands from CPU 71 based on the image information indicated by programs. For example, the display 74 forms a GUI (Graphical User Interface) screen image, and displays various windows, data, etc. necessary for operations.

In addition, the input device 75 is a keyboard, a mouse or the like, and is used to input various operation commands. The drive device 76 is a device into which a storage medium 78 can be inserted, reads data stored in the storage medium 78 and sends the read data to the main memory 72. The communication device 77 is an interface to connect to the network, such as the Internet or a LAN, and may be a modem or a NIC (network interface card), for example.

With this configuration, the CPU 71 executes programs so that the server 3 receives transmission data including DTCs of failure transmitted by a later-described transmission portion 2e of the vehicle navigation ECU 2 via a communication device 12 on the vehicle side, stores the DTCs of failure included in the transmission data into the storage device 73, analyzes the stored DTCs of failure with statistical processing, and creates a database indicating the failed parts and failure frequency of each motor vehicle line.

Next, the vehicle navigation ECU 2 will be described in detail with reference to the drawings. FIG. 3 is a schematic diagram illustrating an example of the vehicle navigation ECU 2, which is a part of the failure detection system 1 according to the embodiment of the present invention.

The vehicle navigation ECU 2 is connected to a GPS (Global Positioning System) antenna 5, a yaw rate sensor 6, a steering sensor 7, a receiver 8, a database 9 and a display 10.

The vehicle navigation ECU 2 is further connected to an ABS (Anti-Lock Brake System) 11, a communication device 12, an ECU_A 14, an ECU_B 15 and an ECU_C 16 using a communication standard such as CAN (Controller Area Network). A sensor 13 is connected to the ECU_A 14. The sensor 13, the ECU_A 14, the ECU_B 15 and the ECU_C 16 form a system A that realizes a specific vehicle control operation.

The vehicle navigation ECU 2 includes, for example, a CPU, a ROM, a RAM, a data bus that connects them to each other, and an I/O interface. The vehicle navigation ECU 2 functions as a measuring portion 2a, a display portion 2b, a collection portion 2c, a determining portion 2d and a transmission portion 2e by executing programs stored in the ROM. The control operation performed by each of these portions 2a-2e will be described later.

The GPS antenna 5 receives radio waves from three satellites among plural satellites launched up in the air above the earth. The measuring portion 2a of the vehicle navigation ECU 2 measures the current position, e.g., a latitude and a longitude of the current position of a vehicle based on the radio waves using a principle of triangulation, for example. When an altitude is measured in addition to the latitude and the longitude, four satellites are used.

The yaw rate sensor 6 detects a yaw rate of a vehicle. The steering sensor 7 is attached to a steering device of a vehicle and detects a steering angle. The database 9 is formed of a storage medium such as a CD-ROM and a DVD-ROM, and stores map information for display and map information for search. The database 9 stores the DTCs of failure and the DTCs indicating reception of the fail information (hereinafter, "DTCs of failure reception") collected by the collection portion 2c in chronological order as a set of DTCs. The database 9 further stores in advance combination information of the DTC of failure and the DTC of failure reception when a failure occurs in the sensor 13 in the above-described system A.

Further, the display 10 displays route information retrieved by the vehicle navigation ECU 2 from the map information for search based on an input destination, together with the map information for display, according to the instruction from the display portion 2 of the vehicle navigation ECU 2. The display 10 also functions as a touch panel, that is, an input device for a driver to input the destination, search condition and the like.

The ABS 11 prevents wheels from being locked during braking, and obtains a vehicle speed used in the ABS control from a wheel speed sensor (not shown). The vehicle navigation ECU 2 obtains the vehicle speed from the ABS 11 through transmission using the communication standard such as CAN.

A receiver 8 complies with an optical and/or radio beacon, and receives road information including traffic jam information from the VICS (Vehicle Information & Communication System.)

Thus, the measuring portion 2a of the vehicle navigation ECU 2 calculates a travel distance and a travel direction of the vehicle based on the vehicle speed obtained from the ABS 11, the yaw rate detected by the yaw rate sensor 6 and the steering angle detected by the steering sensor 7 to measure the current position of the vehicle using autonomous navigation and to supplement the current position when the GPS antenna 5 cannot receive the radio wave from the satellites while the vehicle is traveling between high-rise buildings or in a tunnel.

The display portion 2b of the vehicle navigation ECU 2 displays the map information for display stored in the database 9, the current position of the vehicle measured as described above, the destination input from the touch panel, i.e., the display 10, and the route information retrieved by the measuring portion 2a on the display 10.

The ECU_A 14 includes, for example, a CPU, a ROM, a RAM, a data bus that connects them to each other, and an I/O interface, and functions as a failure detecting portion 14a that performs the control described below according to the programs stored in the ROM.

The ECU_B 15 includes, for example, a CPU, a ROM, a RAM, a data bus that connects them to each other, and an I/O interface, and functions as a control portion 15a that performs the control described below according to the programs stored in the ROM.

Similarly, the ECU_C 16 includes, for example, a CPU, a ROM, a RAM, a data bus that connects them to each other, and an I/O interface, and functions as a control portion 16a that performs the control described below according to the programs stored in the ROM. The control portion 15a and the control portion 16a are related to the failure detecting portion 14a of the ECU_A 14 for control. That is, they are associated with each other, and mutually transmit and receive information necessary for the control of the system A. In other words, the ECU_A 14, ECU_B 15 and ECU_C 16 cooperatively perform the control operation of system A through mutual communication of control information.

The failure detecting portion 14a of the ECU_A 14 detects a failure in an on-board device, i.e., a sensor 13. When a disconnection failure is detected in the sensor 13, the failure detecting portion 14a sends a DTC of failure to the collection portion 2c of the vehicle navigation ECU 2. The collection portion 2c of the vehicle navigation ECU 2 receives the DTC of failure sent by the failure detecting portion 14a and collects it.

Further, when the failure is detected in the sensor 13, the failure detecting portion 14a of the ECU_A 14 sends fail information to the control portion 15a. Upon receiving the fail information, the control portion 15a sends a DTC of failure reception to the collection portion 2c of the vehicle navigation ECU 2. Further, the control portion 15a of the ECU_B 15 sends fail information to the control portion 16a of the ECU_C 16. Upon receiving the fail information, the control portion 16a sends a DTC of failure reception to the collection portion 2 of the vehicle navigation ECU 2.

The collection portion 2c of the vehicle navigation ECU 2 receives the DTCs of failure reception sent by the control portions 15a and 16a and collects them. From a set of DTCs including both the DTCs of failure and the DTCs of failure reception collected by the collection portion 2c, the determining portion 2d of the vehicle navigation ECU 2 identifies or selects only the DTCs of failure.

More specifically, the determining portion 2d of the vehicle navigation ECU 2 identifies the DTC of failure as follows. As shown in FIG. 4, a data frame of the DTC of failure includes fields to which a sender ID, a receiver ID, failure data indicated as PAAA and failure content data are respectively assigned.

On the other hand, a data frame of the DTC of failure reception sent by the ECU_B 15 includes fields to which a sender ID, a receiver ID, and failure data indicated as PBBB are respectively assigned. Further, a data frame of the DTC of failure reception sent by the ECU_C 16 includes fields to which a sender ID, a receiver ID, failure data indicated as PCCC are respectively assigned.

Incidentally, in the above-described failure data, "P" indicates a rough classification of failed parts in a vehicle, "AAA" indicates that a failure occurs in the ECU_A 14, "BBB" indicates that a failure occurs in the ECU_B 15 and "CCC" indicates that a failure occurs in the ECU_C 16.

Thus, because the DTC of failure reception does not include the field to which the content of the failure of the sensor 13 is assigned, the determining portion 2d of the vehicle navigation ECU 2 can identify the DTC of failure from the set of DTCs, including the DTCs of failure and the DTCs of failure reception, by comparing fields included in the DTC of failure and the fields included in the DTC of failure reception. In other words, the DTC of failure may be identified by finding the field to which the content of the failure is assigned.

In addition, the determining portion 2d of the vehicle navigation ECU 2 is provided in advance with combination information of the DTC of failure and the DTC of failure reception collected by the collection portion 2c, as shown in FIG. 5. The determining portion 2d identifies only the DTC of failure from the set of DTCs including the DTCs of failure and the DTCs of failure reception.

The combination information indicates a temporal order of the DTC of failure sent by the ECU_A 14, the DTC of failure reception sent by the ECU_B 15 and the DTC of failure reception sent by the ECU_C that are supposed to be received by the vehicle navigation ECU 2 when a failure occurs in the sensor 13.

Further, the transmission portion 2e of the vehicle navigation ECU 2 transmits only the DTC of failure identified by the determining portion 2d to the roadside center. Thus, the transmission portion 2e transmits the DTC of failure to the server 3 in the roadside center, after the collection portion 2c of the vehicle navigation ECU 2 receives the DTC of failure, which is sent by the ECU_A 14 when the ECU_A 14 detects the failure in the sensor 13, and the subsequent DTCs of failure reception sent by the ECU_B 15 and the ECU_C 16. The transmission portion 2e also transmits the DTC of failure, when the ignition of the vehicle is turned on.

Figure 6:
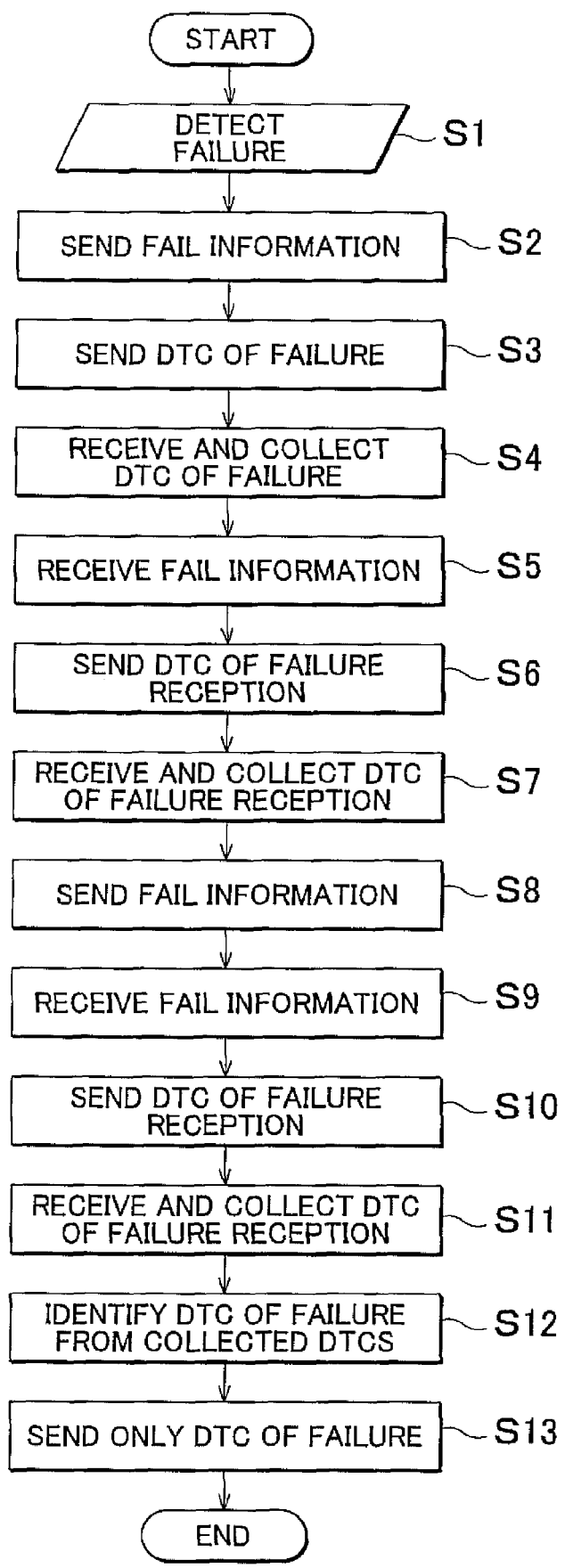
FIG. 6 is a flowchart illustrating the control operation of the failure detection device according to the embodiment of the present invention.

Hereinafter, the control operation of the above-described failure detection system 1 will be described with reference to a flowchart. FIG. 6 is a flowchart illustrating the control operation of the failure detection system 1 according to the embodiment of the present invention.

As shown in FIG. 6, in step S1, the failure detecting portion 14a of the ECU_A 14 detects a failure in the sensor 13. The control proceeds to step S2, in which the failure detecting portion 14a sends fail information to the control portion 15a. Then, the control proceeds to step S3, in which the failure detecting portion 14a sends a DTC of failure to the collection portion 2c of the vehicle navigation ECU 2. In step S4, the collection portion 2c of the vehicle navigation ECU 2 receives and collects the DTC of failure.

In step S5, the control portion 15a of the ECU_B 15 receives the fail information sent by the failure detecting portion 14a of the ECU_A 14. The control proceeds to step S6, in which the control portion 15a sends a DTC of failure reception to the collection portion 2c of the vehicle navigation ECU 2. In step S7, the collection portion 2c of the vehicle navigation ECU 2 receives and collects the DTC of failure reception sent by the control portion 15a.

Further, in step S8, the control portion 15a of the ECU_B 15 sends fail information to the control portion 16a of the ECU_C 16. In step S9, the control portion 16a of the ECU_C 16 receives the fail information sent by the control portion 15a. Further, in step S10, the control portion 16a of the ECU_C 16 sends a DTC of failure reception to the collection portion 2c of the vehicle navigation ECU 2. In step S11, the collection portion 2c of the vehicle navigation ECU 2 receives and collects the DTC of failure reception sent by the control portion 16a of the ECU_C 16.

Then, in step S12, the determining portion 2d of the vehicle navigation ECU 2 identifies only the DTCs of failure based on the set of DTCs, including the DTCs of failure and the DTCs of failure reception collected by the collection portion 2c and stored in the database 9, a comparison among the fields of data frames, and a comparison between the set of DTCs and the combination information stored in advance in the database 9. In step S13, the transmission portion 2e of the vehicle navigation ECU 2 transmits only the DTCs of failure identified by the determining portion 2d to the server 3 in the roadside center via the base station 4 and the network.

Incidentally, in the failure detection method according to the present invention, the operation of detecting a failure in a on-board device and sending failure information may be realized by steps S1 and S3 in FIG. 6, and the operation of receiving and collecting the failure information may be realized by step S4 in FIG. 6.

Further, in the failure detection method according to the present invention, the operation of sending failure notification information when the failure in the on-board device is detected may be realized by steps S2, S5, S8 and S9. The operation of sending failure reception information when the failure notification information is received may be realized by steps S6 and S10 in FIG. 6. The operation of receiving and collecting the failure reception information may be realized by step S11 in FIG. 6.

In addition, the operation of identifying the failure information from the collected failure information and failure reception information, may be realized by step S13 in FIG. 6.

According to the failure detection system 1 of the embodiment of the present invention, the following effects and advantages may be obtained. First, in the case where the failure detecting portion 14a of the ECU_A 14 detects a failure in the sensor 13 and sends fail information to the control portion 15a of the ECU_B 15 and the control portion 16a of the ECU_C 16, the failure detecting portion 14a selects the control portion 15a to send the fail information thereto, and the control portion 15a that receives the fail information then sends fail information to the control portion 16a. Thus, the fail information can be sent to all the control portions 15a and 16a included in the system A that realizes a specific vehicle control operation based on the communication standard of CAN.

Further, the combination information of the DTCs of failure and DTCs of failure reception is stored in the database 9 in advance, and the determining portion 2d of the vehicle navigation ECU 2 can identify only the DTCs of failure from the set of DTCs, including the DTCs of failure and the DTCs of failure reception, stored in the database 9 by the collection portion 2 based on the combination information.

In other words, as to the failure detecting portion 14a, the control portion 15a and the control portion 16a together forming the system A that realizes a specific vehicle control operation, the time point when the collection portion 2c of the vehicle navigation ECU 2 receives the DTC of failure from the failure detecting portion 14a is slightly earlier than the time point when the collection portion 2c receives the DTCs of failure reception from the control portion 15a and the control portion 16a. Thus, the DTC of failure and the DTCs of failure reception form a sequence of temporally consecutive DTCs in a predetermined period of time. Using this fact, a sequence of DTCs arranged in the temporal order defined by the combination information is found from the set of DTCs, including the DTCs of failure and the DTCs of failure reception, and the first DTC in the found sequence of DTCs is identified as the DTC of failure.

In addition, the determining portion 2d identifies the DTC of failure from the set of DTCs based on the comparison between the fields of data frame included in the DTC of failure and the fields of data frame included in the DTC of failure reception. By doing so, accuracy of identification (or selection) of the DTC of failure by the determining portion 2d further improves.

According to both the above-described methods for distinguishing between the DTC of failure and the DTC of failure reception, the determining portion 2d of the vehicle navigation ECU 2 can identify and extract only the DTC of failure from the entire set of DTCs including the DTCs of failure and the DTCs of failure reception once collected by the collecting portion 2c and stored in the database 9 (i.e., storage medium).

Incidentally, in the above-described failure detection system 1, the construction excluding the server 3 in the roadside center and the base station 4 may correspond to the failure detection device according to the claimed invention. In this case, the failure detection device may be provided with the transmission portion 2e that transmits only the DTC of failure identified by determining portion 2d of the vehicle navigation ECU 2 to the server 3 in the roadside center. According to this configuration, the transmission portion 2e can transmit only the DTC of failure to the server 3 in the roadside center.

Accordingly, the loads and costs of the communication between the transmission portion 2e of the vehicle navigation ECU 2 and the server 3 in the roadside center via the network and the base station 4 are significantly reduced. More in detail, in the above-described embodiment, the system A includes three ECUs, and when failure occurs in the sensor 13, the collection portion 2c receives and collects two DTCs of failure reception. Thus, while the total number of DTCs is three, only one DTC, i.e., the DTC of failure is transmitted. Accordingly, the transmission loads and costs are reduced to one third. In other words, the greater the number of ECUs forming the system is, the more the transmission loads and costs are reduced.

Further, because the DTC of failure reception, which indicates a passive failure that arises from the failure in the ECU_A 14, i.e., the failure detecting portion 14a, and does not arise from the failure in the control portion 15a of the ECU_B 15 or the control portion 16a of the ECU_C 16 itself, is not reflected in the failure database created in the server 3 in the roadside center, the accuracy of analysis of failed parts and failure frequency performed at the roadside center improves.

Incidentally, the ECUs (ECU_A, ECU_B, ECU_C) that form a system that realizes a specific vehicle control operation may correspond to the failure detecting portion and failure control portion in the claimed invention. The collection portion and the determining portion in the claimed invention may be realized by, for example, a vehicle navigation system, and may correspond to the collection portion 2c and determining portion 2d in the vehicle navigation ECU 2 of the above-described embodiment. Further, "the control portion is related to the failure detecting portion for control" as recited in the claimed invention means that the control portion and the failure detecting portion are associated with each other and mutually transmit and receive control information to realize the system, or they cooperatively perform a specific control operation of the system through mutual communication of control information. The DTC of failure in the embodiment may be regarded as the failure information in the claimed invention, and the fail information in the embodiment may be regarded as the failure notification information in the claimed invention. Further, the DTC of failure reception in the embodiment may be regarded as the failure reception information in the claimed invention.

Moreover, the plural fields included in the data frame of DTC of failure or plural fields included in the data frame of DTC of failure reception may be regarded as the element information included in the failure information and the failure reception information in the claimed invention. As described in the embodiment, only the failure information (i.e., DTC of failure) includes a field that contains a failure content of the on-board device.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

For example, in the above-described embodiment, the sensor 13 serves as an on-board device, the ECU_A 14 serves as an ECU that detects the failure in the sensor 13, and the ECU_B 15 and ECU_C 16 serve as other ECUs that form the system A. However, this combination is mere one example.

In other words, the present invention may be applied to a system formed of multiple ECUs that operate cooperatively, such as a system of ACC (Adaptive Cruise Control), VSC (Vehicle Stability Control), LKA (Lane Keep Assist), or IPA (Intelligent Parking Assist).

For example, in a case where ACC is realized by an ACC_ECU, an engine ECU and a brake ECU, one of the ACC_ECU, the engine ECU and the brake ECU, may correspond to the failure detecting portion 14a of the ECU_A 14, depending on which sensor in the several types of sensors used in ACC serves as the on-board device, and others of the ACC_ECU, the engine ECU and the brake ECU may respectively correspond to the control portion 15a of the ECU_B 15 and the control portion 16a of the ECU_C 16.

Further, in the above-described embodiment, the collection portion and the determining portion are provided in the vehicle navigation ECU 2; however, the present invention is not limited thereto. For example, a dedicated ECU may be provided serving as the collection portion and the determining portion.

The failure detection device, failure detection system and the failure detection method according to the present invention can improve the accuracy of analysis of the failure database without increasing the communication loads and costs. Accordingly, it is useful when those are used in various vehicles, such as a passenger vehicle, an autotruck and a bus.

What is claimed is:

1. A failure detection device comprising:
   a failure detecting means for detecting a failure in an on-board device and sends failure information;
   a collection means for receiving and collecting the failure information; and
   a control means for controlling the failure detecting means;
   wherein the failure detecting means sends failure notification information to the control means, upon detecting the failure in the on-board device;
   the control means receives the failure notification information and then sends failure reception information to the collection means;
   the collection means receives and collects the failure reception information; and
   the failure detection device further comprises a determining means for identifying the failure information from the failure information and the failure reception information collected by the collection means.

2. The failure detection device according to claim 1, wherein the determining means is provided in advance with combination information of the failure information and the failure reception information collected by the collection means, and identifies the failure information from the failure information and the failure reception information based on the combination information.

3. The failure detection device according to claim 1, wherein the determining means identifies the failure information based on a comparison between element information included in the failure information and element information included in the failure reception information.

4. The failure detection device according to claim 3, further comprising a transmission means for transmitting the failure information identified by the determining means to a roadside center.

5. A failure detection system comprising:
   the failure detection device according to claim 4; and
   the roadside center.

6. A failure detection method comprising:
   a failure detecting step of detecting a failure in an on-board device and sending failure information;
   a failure information collecting step of receiving and collecting the failure information;
   a failure notification information sending step of sending failure notification information when the failure of the on-board device is detected;
   a failure reception information sending step of sending failure reception information when the failure notification information is received;
   a failure reception information collecting step of receiving and collecting the failure reception information; and
   a determining step of identifying the failure information from the failure information and the failure reception information collected.

7. The failure detection method according to claim 6, further comprising a transmitting step of transmitting the identified failure information to a roadside center.

* * * * *